US012721264B2

(12) United States Patent
Bojsen

(10) Patent No.: US 12,721,264 B2
(45) Date of Patent: Sep. 1, 2026

(54) CROP RESIDUE SPREADER ARRANGEMENT WITH INDEPENDENTLY PIVOTING SHAPED RESIDUE DEFLECTORS

(71) Applicant: AGCO International GmbH, Neuhausen (CH)

(72) Inventor: Thomas Smed Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 378 days.

(21) Appl. No.: 18/508,608

(22) Filed: Nov. 14, 2023

(65) Prior Publication Data

US 2024/0196791 A1 Jun. 20, 2024

(30) Foreign Application Priority Data

Dec. 14, 2022 (GB) .................................... 2218830

(51) Int. Cl.
*A01D 41/12* (2006.01)

(52) U.S. Cl.
CPC ................................ *A01D 41/1243* (2013.01)

(58) Field of Classification Search
CPC .......................... A01D 41/1243; A01D 41/127
See application file for complete search history.

(56) References Cited

U.S. PATENT DOCUMENTS 7,390,253 B2 6/2008 Farley et al.
8,463,510 B2 * 6/2013 Knapp ................ A01D 41/127 701/50
8,834,244 B2 * 9/2014 Isaac .................. A01D 41/1243 460/111
10,694,667 B2 6/2020 Reinecke et al.
12,495,732 B2 * 12/2025 Deruyter ............ A01D 41/1243
2007/0026912 A1 * 2/2007 Anderson .......... A01D 41/1243 460/112
2009/0253474 A1 10/2009 Isaac
2011/0093169 A1 * 4/2011 Schroeder .......... A01D 41/1243 701/50
2011/0130181 A1 * 6/2011 Roberge ............. A01D 41/1243 460/111
2013/0095899 A1 * 4/2013 Knapp ................ A01D 41/127 460/111

(Continued)

FOREIGN PATENT DOCUMENTS

SU 1371576 A1 2/1988

OTHER PUBLICATIONS

UK Intellectual Property Office, Search report for related UK Application No. GB2218830.4, dated Jun. 13, 2023, 4 pages.

*Primary Examiner* — Jess Whittington

(57) ABSTRACT

A crop residue spreader arrangement, and an agricultural vehicle fitted with such a crop residue spreader arrangement, are disclosed. The crop residue spreader arrangement comprises a frame, a pair of counter rotating residue spreader wheels carried from the frame, a common frame element, the common frame element being pivotally connected to the frame, the common frame element supporting first and second shaped residue deflectors, each residue deflector being associated with an adjacent residue spreader wheel and each of the first and second shaped residue deflectors being pivotally mounted to the common frame element about coincident horizontal axes.

7 Claims, 5 Drawing Sheets

(56) References Cited

U.S. PATENT DOCUMENTS

2013/0324199 A1* 12/2013 Roberge ............. A01D 41/1243 460/111
2017/0142900 A1* 5/2017 Mahieu .............. A01D 41/1243
2018/0084718 A1* 3/2018 Baumgarten ...... A01D 41/1243
2022/0369554 A1* 11/2022 Christiansen ...... A01D 41/1243
2022/0394923 A1* 12/2022 Christiansen ........ A01D 41/127
2023/0139286 A1* 5/2023 Deruyter ............ A01D 41/1243 460/7
2023/0225246 A1* 7/2023 Leenknegt ......... A01D 41/1243 460/1

* cited by examiner

CROP RESIDUE SPREADER ARRANGEMENT WITH INDEPENDENTLY PIVOTING SHAPED RESIDUE DEFLECTORS

FIELD

The present invention relates to agricultural harvesters such as combine harvesters, and, more particularly, to a crop residue spreader arrangement for spreading crop residue over the ground behind the harvester.

BACKGROUND

For many decades, self-propelled combine harvesters have been used by farmers to harvest a wide range of crops including cereals, maize and oil-seed rape. Typically, a combine harvester cuts the crop material, threshes the grain (or seed) therefrom, separates the grain from the straw, and cleans the grain before storing in an on-board tank. Straw and crop residue is ejected from the rear of the machine.

It is well known to fit combine harvesters with a cutting machine such as a straw chopper at the rear of the machine for chopping the straw ejected from the separating apparatus. Depending on the requirements of the farmer, the straw is either deposited directly onto the ground in windrows for subsequent baling and removal, or chopped and spread onto the field behind the combine for incorporation back into the soil. Means to direct the straw onto the ground typically comprises a tailboard or spreader arrangement incorporating a pair of counter rotating spreader wheels.

Variables such as the field's terrain, cutting height and wind direction can affect the final placement of the crop residue. Farmers want the spread width to be quickly and independently adjustable left to right whilst still maintaining an even distribution of straw and crop residue across the field.

It is an advantage of the present invention that consistent crop residue spreading is addressed. It is an object of the invention to provide even spread width together with side to side compensation without reducing the speed of the counter rotating spreader wheels.

BRIEF SUMMARY

According to a first aspect of the present invention, a crop residue spreader arrangement comprises a frame, a pair of counter rotating residue spreader wheels carried from the frame, a common frame element, the common frame element being pivotally connected to the frame, the common frame element supporting first and second shaped residue deflectors, each residue deflector being associated with an adjacent residue spreader wheel and each of the first and second shaped residue deflectors being pivotally mounted to the common frame element about coincident horizontal axes.

Preferably, the common frame element is pivotally connected to the frame about a horizontal axis.

More preferably, the common frame element can be pivoted about the horizontal axis by a crank, hydraulic or pneumatic actuation or by linear actuation.

Preferably, a cam arrangement is provided between each shaped residue deflector and the common frame element.

Preferably, each shaped residue deflector comprises a carrying arm and a material deflector. Preferably, the material deflector is curved about an outer circular profile of the adjacent residue spreader wheel. Preferably the material deflector is generally triangular in shape. Preferably the material deflector comprises a sheet material having an upper linear edge having first and second ends, a first longer edge depending from the first end of the upper edge, a second shorter edge depending from the second end of the upper edge and a fourth edge connecting the distal ends of the first and second edges.

According to a second aspect of the present invention an agricultural harvester comprises a chassis and a crop residue spreader arrangement according to the first aspect of the present invention carried by said chassis at a rear of the agricultural harvester.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Relative terms such as forward, rearward, transverse, lateral, longitudinal and sideways will be made with reference to the normal forward direction of travel of the combine harvester 10 and indicated by arrow F represented in FIG. 1. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference to the general direction of crop flow along the material conveyance systems described.

Figure 1:
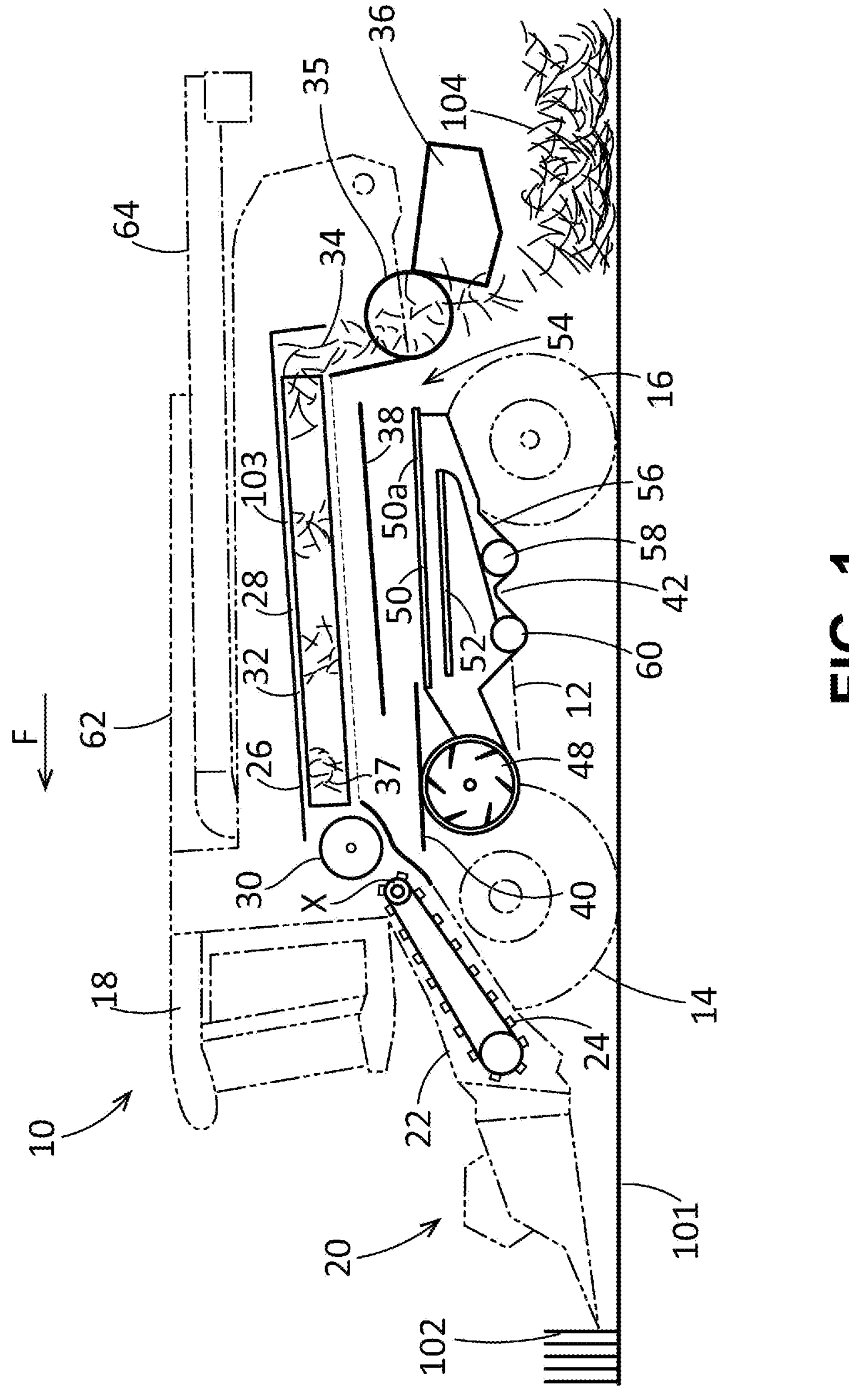
FIG. 1 shows a schematic side view of a known combine harvester comprising a residue spreader positioned after or downstream of a straw chopper.

FIG. 1 illustrates in schematic form the main components of the crop processing system of a combine harvester 10 and will be used to explain the flow of material below. The crop processing system is shown in solid lines whilst the outline profile of harvester 10 is shown in broken lines.

Combine harvester 10, hereinafter referred to as 'combine', includes a chassis 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feeder house 22 which is pivotable about a transverse axis X to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into the feeder house 22. An elevator 24, normally in the form of a chain and slat conveyor or elevator as shown, is housed within the feeder house 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

As may be seen in FIG. 1, the feed beater 30 rotates on a transverse axis. The feed beater 30 comprises crop engaging deflectors (not shown) which convey the crop material stream under the beater and into rotor housings 32 which each house one of said threshing rotors 28. It should be appreciated that only the left-hand threshing rotor 28 and rotor housing 32 are visible in FIG. 1 as the corresponding right-hand arrangement is hidden from view.

The threshing rotors 28 are positioned to have a generally longitudinal, or fore and aft, rotation axis which is normally inclined upwardly towards the rear of the combine 10.

Flighting elements (not shown) provided on the front end of each threshing rotor 28 engage the crop material stream which is then conveyed as a ribbon or mat 103 in a generally rearward axial and helical path in the space between the threshing rotor 28 and the rotor housing 32.

The axial flow threshing rotors 28 serve to thresh the crop stream in a front region, separate the grain therefrom in a rear region, and eject the straw residue via a straw discharge chute 34 provided below a rear portion of the threshing rotors 28, the straw falling either directly onto the ground in a windrow, or via a straw chopper 35 and a crop residue spreader arrangement 36 to be described in more detail later.

A part-cylindrical grate 37 provided in the underside of each rotor housing 32 allows the separated material to fall by gravity onto either a return pan 38 located below a rear section of the processor 26, or directly onto a stratification pan 40 located below a front section of the processor 26. In practice, the separated material falling through the grate 37 is typically a mix of grain and material other than grain (MOG) which may include chaff, tailings and some straw.

The return pan 38 and stratification pan 40 together serve as a material conveyance system arranged to convey the separated crop material to a grain cleaning shoe 42. The return pan 38 and stratification pan 40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge 44 from where the material falls or cascades onto the stratification pan 40. The material on the stratification pan 40 is conveyed rearwardly to a rear discharge edge 46 from where the material falls into the cleaning system or "shoe" 42.

The grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material (mostly chaff) passes to the end of the chaffer and out of the rear of the machine at shoe outlet 54. A rear section of chaffer **50*a* is commonly independently adjustable and is configurable to allow tailings to pass there through into a re-threshing region 56 from where the tailings are conveyed via a re-threshing auger 58 back to the crop processor 26**.

Lower sieve 52 is also driven in an oscillating manner to convey the collected grain-MOG mix rearwardly wherein the material falling therethrough is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

Further, the combine 10 also includes an unloading system which includes an unloading auger 64.

Figure 2:
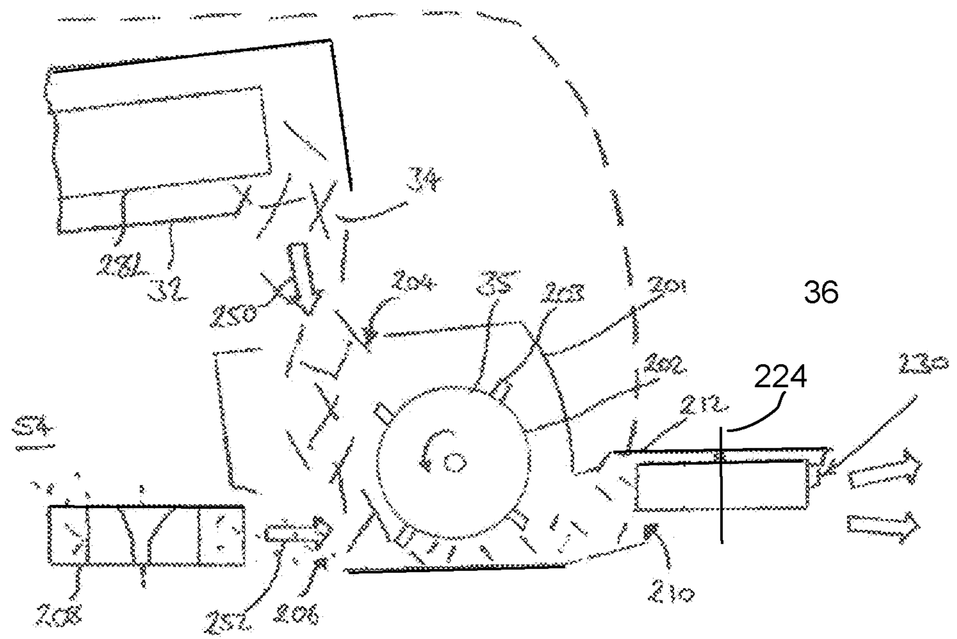
FIG. 2 shows an enlarged schematic side view of a residue handling system located at the rear of a combine harvester in accordance with an embodiment.

Aspects of the invention relate to the handling of the crop residue ejected by the straw chopper 35 and in particular to the crop residue spreader arrangement 36. FIG. 2 shows the passage of straw dropped by the processing rotors 28 and of the chaff from the shoe outlet 54.

The straw chopper 35 has a housing 201 inside which a chopper drum 202 is journaled for rotation on a transverse axis. The chopper drum 202 has sets of knives 203 pivotally mounted to the circumferential surface, the knives 203 interacting with stationary knives (not shown) to chop the material. An upper part of the housing 201 is formed with a first inlet 204 for reception of threshed crop residue (usually and mostly straw) falling from the rear of crop processing rotors 28L, 28R, indicated by arrow 250. It should be appreciated that only the left-hand rotor 28L can be seen in FIG. 2.

A front region of the housing 201 is optionally provided with a second inlet 206 for reception of chaff either directly from the shoe outlet 54 or via a chaff spreader 208 as is known in the art. The movement of chaff from chaff spreader 208 through the second inlet 206 is indicated by arrow 252.

The residue entering the housing 201 is conveyed tangentially around and under the chopper drum 202, is chopped by the knives 203, and is expelled through an elongate transverse outlet 210 provided in a rear lower region of the housing 201.

The residue is directed from the transverse outlet 210 to a crop residue spreader arrangement 36. The crop residue spreader arrangement 36 comprises counter rotating left and right hand residue spreader wheels 220,222, with each residue spreader wheel having an associated shaped residue deflector 230,232. The residue spreader wheels 220,222 are supported on a frame 212. The frame 212 is connected to the chassis 12 in any suitable manner. A common frame element 240 is pivotally mounted to the frame 212 and supports the first and second shaped residue deflectors 230,232.

Each residue spreader wheel 220,222 comprises a driven rotatable vane mounted in a housing. The vane has a number of arms in the form of paddles adapted for rotation about a central generally vertical axis 224, 226. The housing provides an inlet whereby chopped residue is introduced to the residue spreader wheel and an outlet from which the chopped residue is directed in a generally rearward direction of flow out behind the combine harvester 10 on to the ground 101.

Each shaped residue deflector 230,232 comprises a carrying arm 234,236 and a material deflector or tailboard 235,237 carried at a first free end of the carrying arm 234,236. A second end of each carrying arm 234,236 is provided with an independent pivot connection 242 to the common frame element 240. The axis of the independent pivot connection 242 extends horizontally to allow each carrying arm 234,236 to pivot up and down with respect to the common frame element 240.

The common frame element 240 is itself pivotally connected to the frame 212 by way of a main pivot axis 244 (FIGS. 8-11). The main pivot axis 244 extends horizontally to allow the common frame element 240 (and the associated carrying arms 234,236) to pivot up and down with respect to the frame 212.

Each carrying arm 234,236 is provided with a cam arrangement 246,248 providing an adjustment pivot allowing individual adjustment of each carrying arm 234,236 and associated shaped material deflector or tailboard 235,237 about the axis of the independent pivot connection 242.

Figure 6:
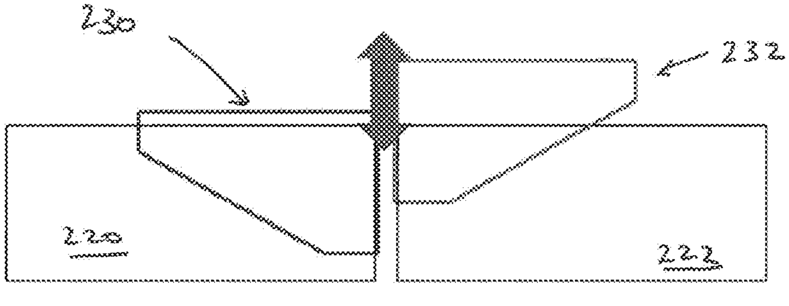
FIG. 6 shows a shows a crop residue spreader in a fourth position providing a wide spread of crop residue offset to the right.
Figure 7:
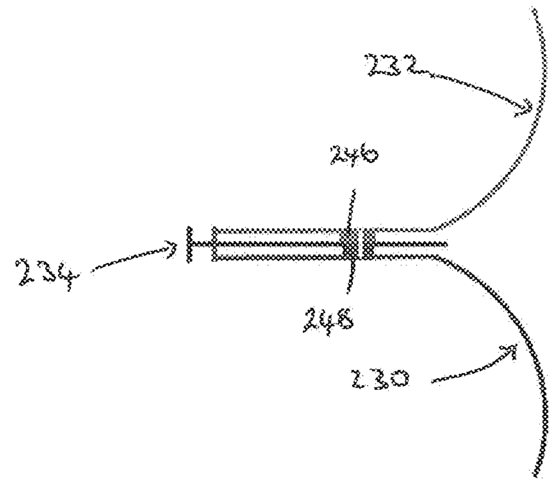
FIG. 7 shows a schematic plan view of the first and second shaped tailboards.

As shown most clearly in FIG. 7, the shaped material deflectors or tailboards 235,237 are curved and, in use, extend laterally about the outer circular profile of the adjacent residue spreader wheel 220,222. Viewed looking towards the rear end of the combine harvester 10 (as in FIGS. 3 to 6) the tailboards 235,237 are generally triangular in form having a relatively broader portion at a first end tapering to a relatively narrower portion at a second end remote from the carrying arm. The upper edge of each tailboard 235,237 remains aligned with the carrying arm 234,236 and is broadly aligned with the upper and lower edges of the associated residue spreader wheel 220,222.

In the illustrated embodiment (cf FIGS. 3-6), each material deflector or tailboard 235,237 comprises a sheet material having an upper linear edge 254 having a first inner end and a second outer end, a first longer edge 256 depending from the first inner end of the upper edge, a second shorter edge 258 depending from the second outer end of the upper edge and a fourth edge connecting the distal ends of the first and second edges. The fourth edge includes a longer sloping portion 260 and a shorter portion 262 running substantially parallel to the first longer edge 254.

Each material deflector 235,237 is located adjacent the outlet of a respective residue spreader wheel 220,222 to manipulate the direction and distribution of the discharged chopped residue. By use of the pivot connections 242 on main pivot axis 244 as described above, each shaped material deflector 235,237 can be individually vertically adjusted in order to provide a desired spread width together with side to side compensation without the need to change the speed of the residue spreader wheels 220,222.

Figure 3:
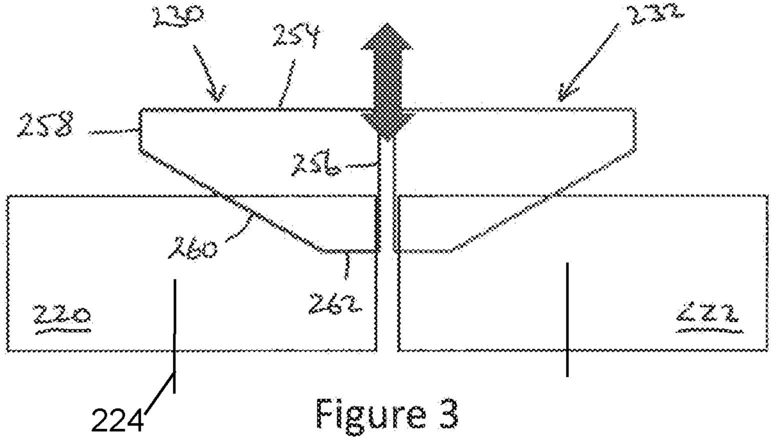
FIG. 3 shows a crop residue spreader in a first position permitting only a narrow spread of crop residue.
Figure 4:
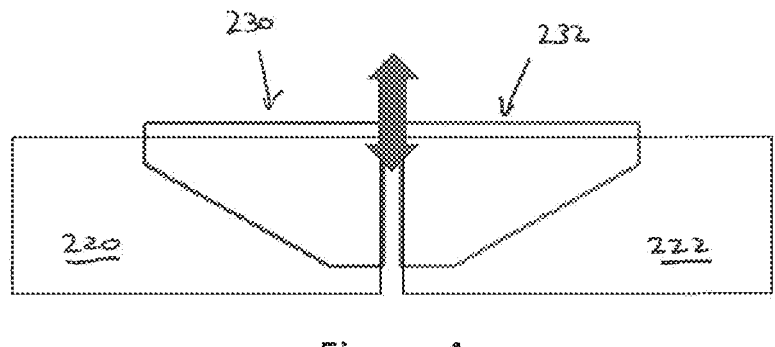
FIG. 4 shows a crop residue spreader in a second position permitting a wider spread of crop residue.

FIGS. 3 to 6 show a rear view of the crop residue spreader arrangement. Left and right hand residue spreader wheels 220,222 can be seen together with the material deflector 235,237 of the left and right shaped residue detectors 230,232. In FIG. 3 the tailboards 235,237 are in a raised position resulting in a narrow spread of residue. Lowering the tailboards 235,237 into the residue stream exiting the residue spreader wheels 220,222 widens the resulting spread. In FIG. 4, the shaped tailboards 235,237 are in a lowered position resulting in a relatively broad spread.

Figure 5:
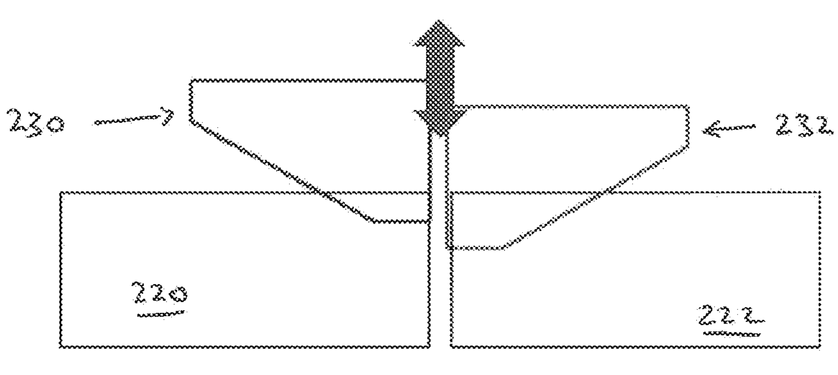
FIG. 5 shows a shows a crop residue spreader in a third position providing a narrow spread of crop residue offset to the left.
Figure 5:

The shaped tailboards 235,237 may also be operated independently of one another. In FIGS. 5 and 12, the right hand tailboard 237 is lower than the left hand tailboard 235 resulting in a narrow spread offset to the left. In FIGS. 6 and 13, the right hand tailboard 237 is raised relative to the left hand tailboard 235 resulting in a wide spread offset to the right.

FIG. 7 shows a plan view of the common frame element 240 and associated shaped residue deflectors 230,232 of the crop residue spreader arrangement.

Figure 8:
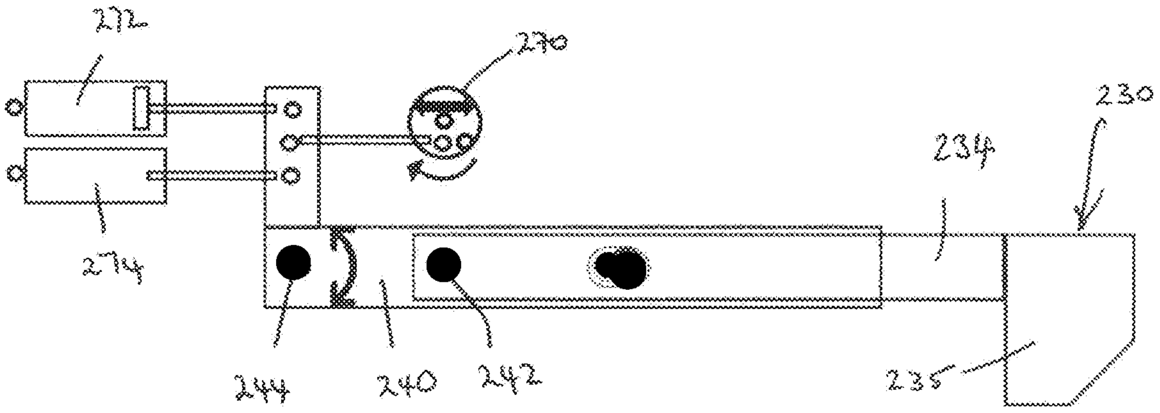
FIG. 8 shows a schematic side view of the shaped tailboards of FIG. 7.

FIG. 8 illustrates examples of how the common frame element 240 can be pivoted with respect to the frame 212 about the main pivot axis 244. In the illustrated example, movement may be actuated by a crank 270, by hydraulic or pneumatic actuation 272 or by linear actuation 274. In practice, only one of these alternatives may be provided depending upon space restraints and requirements.

Where movement is actuated by hydraulic or pneumatic actuation 272 or by linear actuation 274 additional actuators may be provided for controlling movement of each of the carrying arms 234,236 about the pivot connection 242 without the need for the cam arrangements described below. Alternatively the cam arrangement used below may be used.

Figure 9:
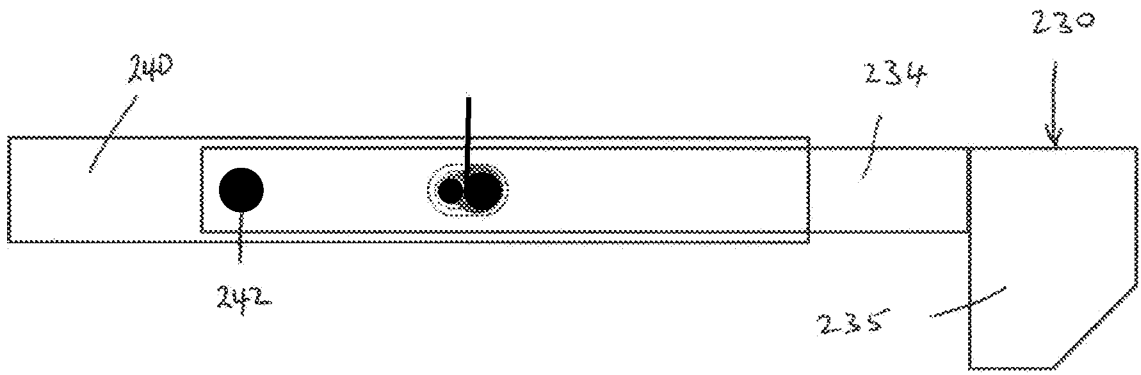
FIG. 9 shows a schematic view of the shaped tailboards in which the first and second shaped tailboards are aligned.
Figure 10:
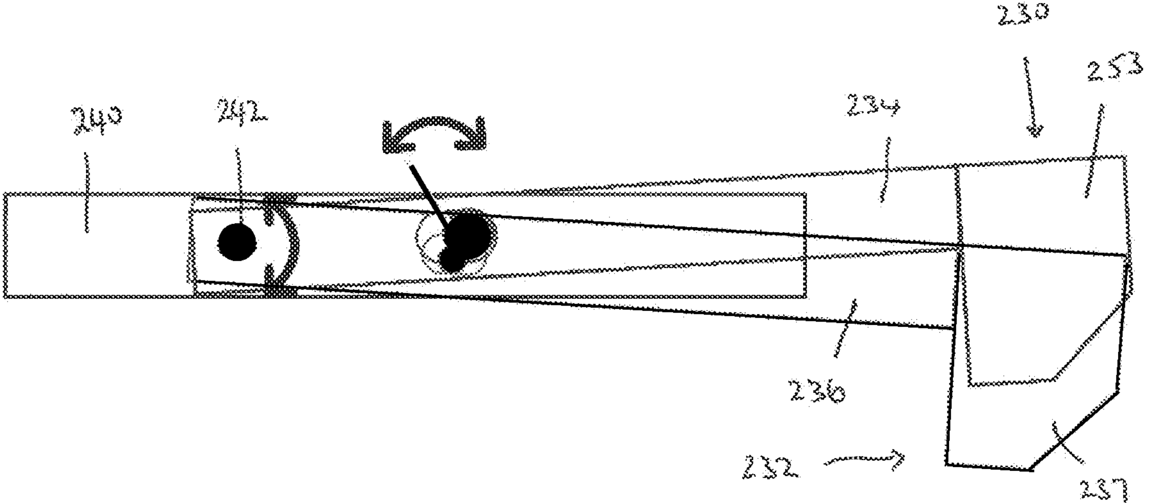
FIG. 10 shows a schematic view similar to that of FIG. 9 in which first and second shaped tailboards have been adjusted to provide a right hand side offset.
Figure 11:
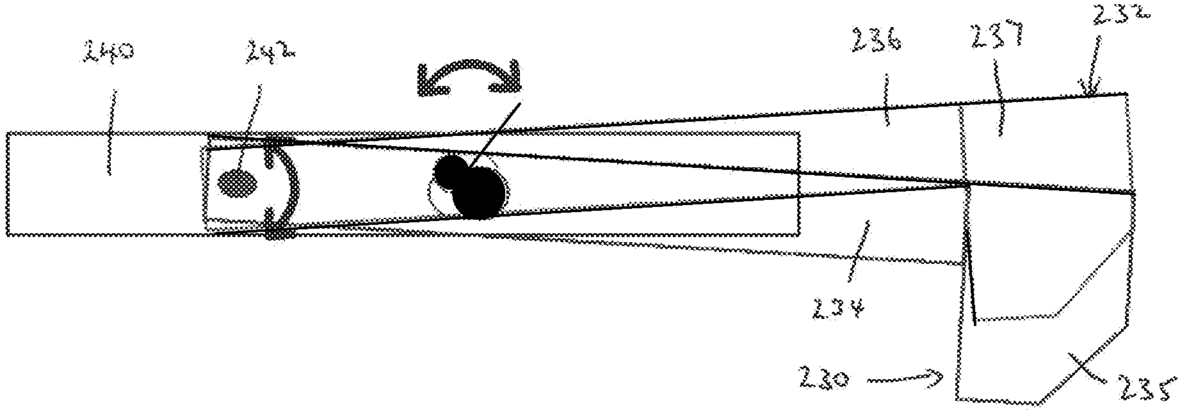
FIG. 11 shows a schematic view similar to that of FIG. 9 in which first and second shaped tailboards have been adjusted to provide a left hand side offset.

FIGS. 9 to 11 schematically show operation of the cam arrangements 246,248 between the carrying arms and the common frame element. In FIG. 10 there is no offset and the right hand cam 246 and the left hand cam 248 are aligned horizontally. The left hand cam 248 is bigger than the right hand cam 246 to compensate for the different length from pivot connection 242 to cam and the desired resulting end movement.

In FIG. 10 the left and right hand cams 246,248 are offset to lower the right hand residue deflector 232 (associated with the right hand residue spreader wheel 222) and the raise the left hand residue deflector 230.

In FIG. 11 the cams 246,248 have been offset in the opposite direction, thereby raising the right hand residue deflector 232 (associated with the right hand residue spreader wheel 222) and the lowering the left hand residue deflector 230.

All references cited herein are incorporated herein in their entireties. If there is a conflict between definitions herein and in an incorporated reference, the definition herein shall control.

From reading the present disclosure, other modifications will be apparent to persons skilled in the art. Such modifications may involve other features which are already known in the field of combine harvesters and component parts therefore and which may be used instead of or in addition to features already described herein.

What is claimed is:

1. A crop residue spreader arrangement comprising a frame, a pair of residue spreader wheels carried from the frame, each residue spreader wheel of the pair of residue spreader wheels rotatable about a vertical axis so as to counter rotate with respect to the other residue spreader wheel of the pair of residue spreader wheels, a common frame element, the common frame element being pivotally connected to the frame, the common frame element supporting first and second shaped residue deflectors, each of the first and second shaped residue deflectors being associated with an adjacent residue spreader wheel of the pair of residue spreader wheels and each of the first and second shaped residue deflectors being pivotally mounted to the common frame element about coincident horizontal axes parallel to a line connecting the vertical axes of the pair of residue spreader wheels, wherein the common frame element is pivotally connected to the frame about a horizontal axis parallel to the line connecting the vertical axes of the pair of residue spreader wheels, and wherein a cam arrangement is provided between each of the first and second shaped residue deflectors and the common frame element configured to independently pivot the first and second shaped residue deflectors.

2. A crop residue spreader arrangement according to claim 1, wherein the common frame element can be pivoted about the horizontal axis by a crank, hydraulic or pneumatic actuation or by linear actuation.

3. A crop residue spreader arrangement according to claim 1, wherein each shaped residue deflector comprises a carrying arm and a material deflector.

4. A crop residue spreader arrangement according to claim 3, wherein the material deflector is curved about an outer circular profile of the adjacent residue spreader wheel of the pair of residue spreader wheels.

5. A crop residue spreader arrangement according to claim 3, wherein the material deflector a shape having a relatively broader portion at a first end tapering to a relatively narrower portion at a second end.

6. A crop residue spreader arrangement according to claim 3, wherein the material deflector comprises a sheet material having an upper linear edge having first and second ends, a first longer edge depending from the first end of the upper edge, a second shorter edge depending from the second end of the upper edge and a fourth edge connecting the distal ends of the first and second edges.

7. An agricultural harvester comprising a chassis and a crop residue spreader arrangement according to claim 1 carried by said chassis at a rear of the agricultural harvester.

* * * * *